US006786156B2

(12) United States Patent
Takebayashi et al.

(10) Patent No.: US 6,786,156 B2
(45) Date of Patent: Sep. 7, 2004

(54) SAFETY DEVICE FOR ROTARY PRINTING PRESS

(75) Inventors: Takashi Takebayashi, Kanagawa (JP);
Masashi Takenouchi, Kanagawa (JP);
Kohji Yoshizawa, Kanagawa (JP)

(73) Assignee: Kabushikikaisha Tokyo Kikai Seisakusho, Tokyo (JP)

( * ) Notice: Subject to any disclaimer, the term of this patent is extended or adjusted under 35 U.S.C. 154(b) by 4 days.

(21) Appl. No.: 10/298,614

(22) Filed: Nov. 19, 2002

(65) Prior Publication Data

US 2003/0154875 A1 Aug. 21, 2003

(30) Foreign Application Priority Data

Feb. 19, 2002 (JP) .................................... 2002-042068

(51) Int. Cl.$^7$ ................................................ B41F 33/00
(52) U.S. Cl. ..................................... 101/480; 101/494
(58) Field of Search ............................... 100/349, 350;
101/480, 494, 217, 142, 443, 144

(56) References Cited

U.S. PATENT DOCUMENTS

| | | | | |
|---|---|---|---|---|
| 1,705,120 | A | * 3/1929 | Johnstone | .................. 74/613 |
| 4,295,421 | A | * 10/1981 | Abendroth et al. | .......... 101/216 |
| 5,241,903 | A | 9/1993 | Lampic | ..................... 100/349 |
| 2003/0150952 | A1 | * 8/2003 | Fuchs et al. | ............... 242/542 |

FOREIGN PATENT DOCUMENTS

| | | |
|---|---|---|
| DE | 714 1941 | 11/1971 |
| GB | 1 267 120 | 3/1970 |
| JP | 05-3321/1993 | 1/1993 |

OTHER PUBLICATIONS

Graphic Technology–society requirements for printing press systems: Draft International Standard ISO/DIS 12648; Japan Printing Machinery Manufacturers Association; Jul. 2001.

\* cited by examiner

Primary Examiner—Daniel J. Colilla
(74) Attorney, Agent, or Firm—Morgan, Lewis & Bockius LLP (57) ABSTRACT

A safety device for rotary printing press is provided in which, if a blanket cylinder and a plate cylinder move a little larger, a gap between surfaces of the cylinders and guard member can be maintained to be less than a predetermined value and the function of safety protection is kept properly. In a safety device provided at the feeding side of an in-running nip formed by a rotary body in which the center of the rotation of the rotary body can be displaceable in position, the safety device comprising: a guard member 40 movably positioned in the vicinity of an outer circumferential surface of the rotary body; a guard member displacement means 1, 2, 3 positioned between the rotary body and the guard member for making the guard member displace in accordance with the displacement of the center of the rotation of the rotary body; and wherein a gap between the outer circumferential surface of the rotary body and the guard member is set to be substantially constant in spite of the movement or shift of the center of the rotation of the rotary body.

26 Claims, 5 Drawing Sheets

SAFETY DEVICE FOR ROTARY PRINTING PRESS

CROSS-REFERENCE TO RELATED APPLICATIONS

This application claims the benefit of priority based on Japanese Application No. 2002-042068, filed Feb. 19, 2002, which is incorporated by reference herein in its entirety.

BACKGROUND OF THE INVENTION

The present invention is generally related to a safety device for rotary printing press, more particularly to a safety device for rotary printing press in which a blanket cylinder and a plate cylinder rotate in contact with each other.

A conventional safety device for rotary printing press is disclosed in Examined Japanese Utility Model Publication (KOKOKU) No. Hei 5-3321. The conventional art disclosed therein is related to the protection of an in-running nip formed by the blanket cylinder and the plate cylinder. The safety device is fitted directly to a frame and is a fixed stationary type. When the cylinders are shifted by a trip means between the state in which the outer circumferential surfaces of cylinders are in contact with each other for printing and the state in which the outer circumferential surfaces of cylinders are kept away from each other to make a paper web travel smoothly, to make the loss of paper lesser at the start of printing, to prevent non-printing portion of the cylinders from oiling at the suspension of printing or to prevent paper rolling in operation at a low speed and so on, if the amount of trip of cylinders get large, a gap between the cylinders and a safety member becomes larger in either the state of the outer circumferential surfaces of cylinders being in contact with each other or the state of the outer circumferential surfaces of cylinders being kept away from each other, there is a risk of pulling a tip of fingers or a sleeve of working clothes and so on.

Figure 5:
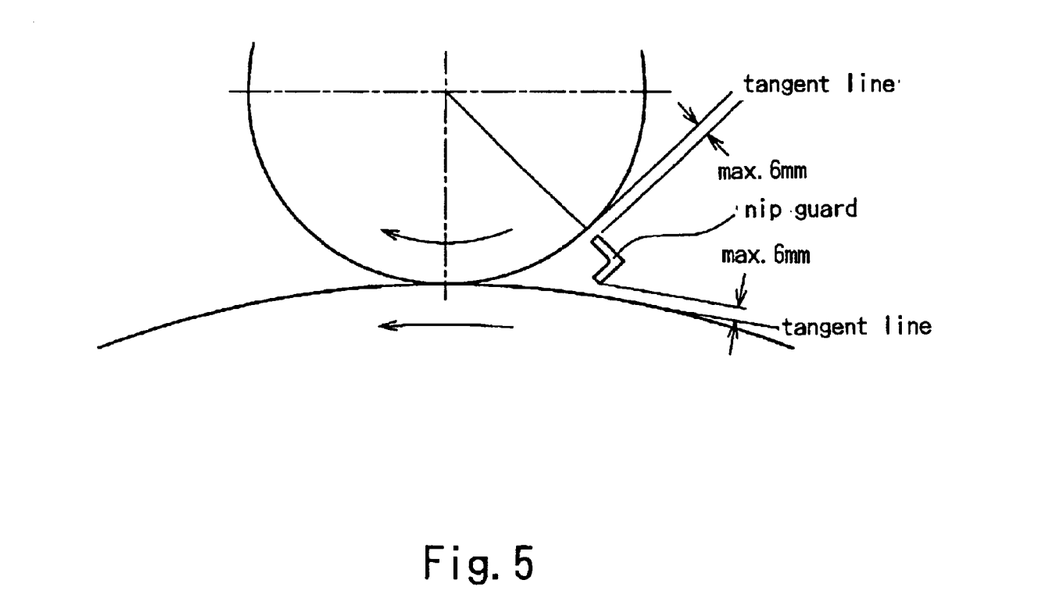
FIG. 5 is a view showing a gap between the cylinder and a nip guard in the protection of the in-running nip described in the "Graphic technology—Safety requirements for printing press systems" of the Draft International Standard ISO/DIS 12648".

Furthermore, in recent years, internationalization of standard on "Safety of Machinery" has come to its highest. In the printing business circle as well, safety standard on printing machine which meets international standard requirements is under consideration, as shown in "Graphic technology— Safety requirements for printing press systems" of the Draft International Standard ISO/DIS 12648" issued by Japan Printing Machinery Manufacturers Association in July 2001, for example. With respect to the protection of an in-running nip, consideration is progressively in the direction that a gap between the outer circumferential surface of the cylinders and a nip guard as a guard member is defined to be less than 6 mm as shown in FIG. 5. But, there is the possibility of failure to meet the requirements.

As described above, in a safety device provided in the in-running nip formed by movable cylinders, there has been the need for a safety device in which even if cylinders move a little larger, a gap between the surfaces of cylinders and the guard member can be maintained to be less than a predetermined value and the function of safety protection is kept properly.

SUMMARY OF THE INVENTION

Therefore, it is a primary object of the invention to accomplish the above-mentioned objects.

Namely, a safety device according to the present invention is one provided at the feeding side of an in-running nip formed by a rotary body having the center of the rotation thereof being displaceable in position.

The safety device comprises a guard member movably positioned in the vicinity of an outer circumferential surface of the rotary body and a guard member displacement means positioned between the rotary body and the guard member for making the guard member displace in accordance with the displacement of the center of the rotation of the rotary body, and is characterized by that a gap between the outer circumferential surface of the rotary body and the guard member is set to be substantially constant in spite of the movement or shift of the center of the rotation of the rotary body.

By this constitution, as the gap between the outer circumferential surface of the rotary body and the guard member is kept to be substantially constant in spite of the movement or shift of the center of the rotation of the rotary body, safety protection of the in-running nip has become realized.

Furthermore, a safety device includes a guard member that is normally set to be in the state pushed toward the outer circumferential surface of the rotary body by a forcing means, and the guard member displacement means has a receiving surface for receiving a force of the forcing means, and the receiving surface is set to be displaceable in accordance with the movement or shift of the center of the rotation of the rotary body.

By this constitution, the gap between the outer circumferential surface of the rotary body and the guard member is always kept to be substantially constant.

Still further, a safety device includes a guard member displacement means that rotatably supports the rotary body at the displaced or shifted position and has a bearing device provided movably in angular displacement with respect to a frame and also has a cain mounted on the bearing device, and a working surface of the cam is arranged to be the receiving surface.

By such constitution, the gap between the outer circumferential surface of the rotary body and the guard member is always kept to be substantially constant.

Preferably the guard member displacement means is constituted of a trip means, a bearing means and a cam.

Preferably, in addition, the trip means is composed of a link mechanism in which; a driving source of the link mechanism is an actuator for tripping; a tip of a rod of the actuator is coupled movably in angular displacement to an end portion of one of two arms divaricating at an obtuse angle from a center of a crotch arm by making use of a bracket which supports a head side of the actuator as a cardinal point of angular displacement; and the rotary body as a blanket cylinder is movably shifted to the contact position and non-contact position with respect to a printing cylinder having the center of the rotation thereof being fixed.

By such constitution, the trip of the blanket cylinder is detachably done in accordance with extension and retraction of the rod of the actuator.

Further preferably the tip of the other arm of the crotch arm is coupled movably in angular displacement to one end of a connecting rod, and the other end of the connecting rod is coupled movably in angular displacement to an end of salience of the arm which is fitted to a cap constituting a bearing means.

Still further preferably the cap is fitted integrally and movably in angular displacement to a bearing mechanism which is fitted movably in angular displacement about the center of an opening made in a frame, and the bearing mechanism movably supports a shaft of the blanket cylinder in order for the center of the shaft of the blanket cylinder to eccentrically position by a constant quantity of eccentricity apart from the center of the opening, and the cam is provided with a circular arc circumferential surface having a cam surface arranged to be a little larger in radius than the outer circumferential surface of the blanket cylinder and also to be concentric with the blanket cylinder.

Furthermore preferably a guard means including the guard member further comprises a bracket attached to each of the two frames opposing with each other; a stepped or joggled pins installed in a stepped hole of each of the brackets; an L-shape arm fitted movably in angular displacement to each stepped pin with a snap or retaining ring for a shaft; and the guard member is positioned between the two frames in parallel with the center of the shaft of the blanket and arranged to be a little longer than the length of the outer circumferential surface of the blanket cylinder.

Still further preferably a concave hole for spring is provided in a raised portion of the bracket on the opposite side of the blanket cylinder with the L-shape arm between, and a compression spring being a forcing means is loaded in the concave hole for spring so as to regularly push the guard member toward the blanket cylinder via the L-shape arm, and a stopper is provided in the bracket on the opposite side of the raised portion with the L-shape arm between so as to determine the limit of displacement of the guard member pushed toward the blanket cylinder via the L-shape arm.

BRIEF DESCRIPTION OF THE DRAWINGS

The foregoing and other features of the present invention will become apparent to those skilled in the art to which the present invention relates from reading the following description with reference to the accompanying drawings, in which.

Furthermore, the embodiment of the device is symmetrical with respect to the center of the machine. Namely, the other side of the safety device is on the opposite side of FIG. 2.

DETAILED DESCRIPTION OF THE PREFERRED EMBODIMENTS

Referring now to Figures, the embodiments of a safety device of the present invention will be explained.

In an embodiment of the present invention as shown in Figures, a guard member displacement means is formed by a trip means 1, a bearing means 2 and a cam 3.

Figure 1:
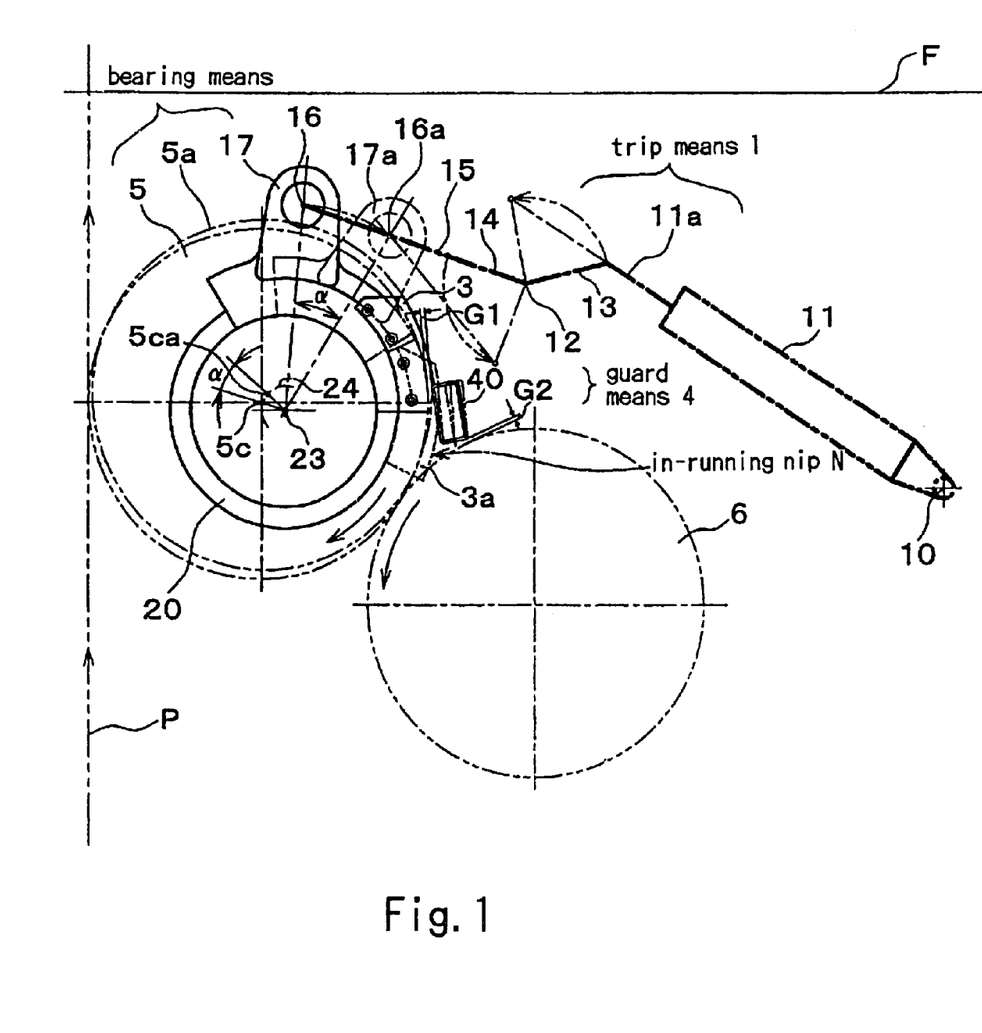
FIG. 1 is a schematic front view showing an overall constitution of a nip section formed by a blanket cylinder and a plate cylinder positioned on the right-hand side of a running paper as one embodiment of the present invention.

One set of the trip means 1 of the rotary press is positioned to be substantially symmetrical with respect to the traveling paper P. In FIG. 1, one of the trip means 1 positioned to be substantially symmetrical is schematically shown. The trip means 1 is composed of a link mechanism. A driving source of the link mechanism is an actuator 11. A tip of a rod 11a of the actuator 11 is coupled movably in angular displacement to an end portion of an arm 13 by making use of a bracket 10 which supports a head side of the actuator 11 as a cardinal point of angular displacement. Thus, the trip of a blanket cylinder 5 is detachably done in accordance with extension and retraction of the rod 11a of the actuator 11. Arms 13 and 14 divaricate at an obtuse angle from a center of a crotch arm 12. A tip of the other arm 14 of the crotch arm 12 is coupled movably in angular displacement to one end of a connecting rod 15. In turn, the other end of the connecting rod 15 is coupled movably in angular displacement to an end of salience 16 of an arm 17 which is fitted to a cap 20 constituting a bearing means 2. By these composition, the bracket 10 to the arm 17 are coupled by the link mechanism.

The cap 20 is fitted integrally and movably in angular displacement to a bearing mechanism 21 (shown in FIG. 2) which is fitted movably in angular displacement about the center 23 of an opening 22 made in a frame F. The bearing mechanism 21 movably supports a shaft 5b of the blanket cylinder 5 in order for the center 5c of the shaft 5b of the blanket cylinder 5 to eccentrically position by the quantity of eccentricity 24 apart from the center 23 of the opening 22. In addition, the end of salience 16 of the arm 17 protrudes in the direction of radius about the center 23 of the opening 22.

Figure 2:
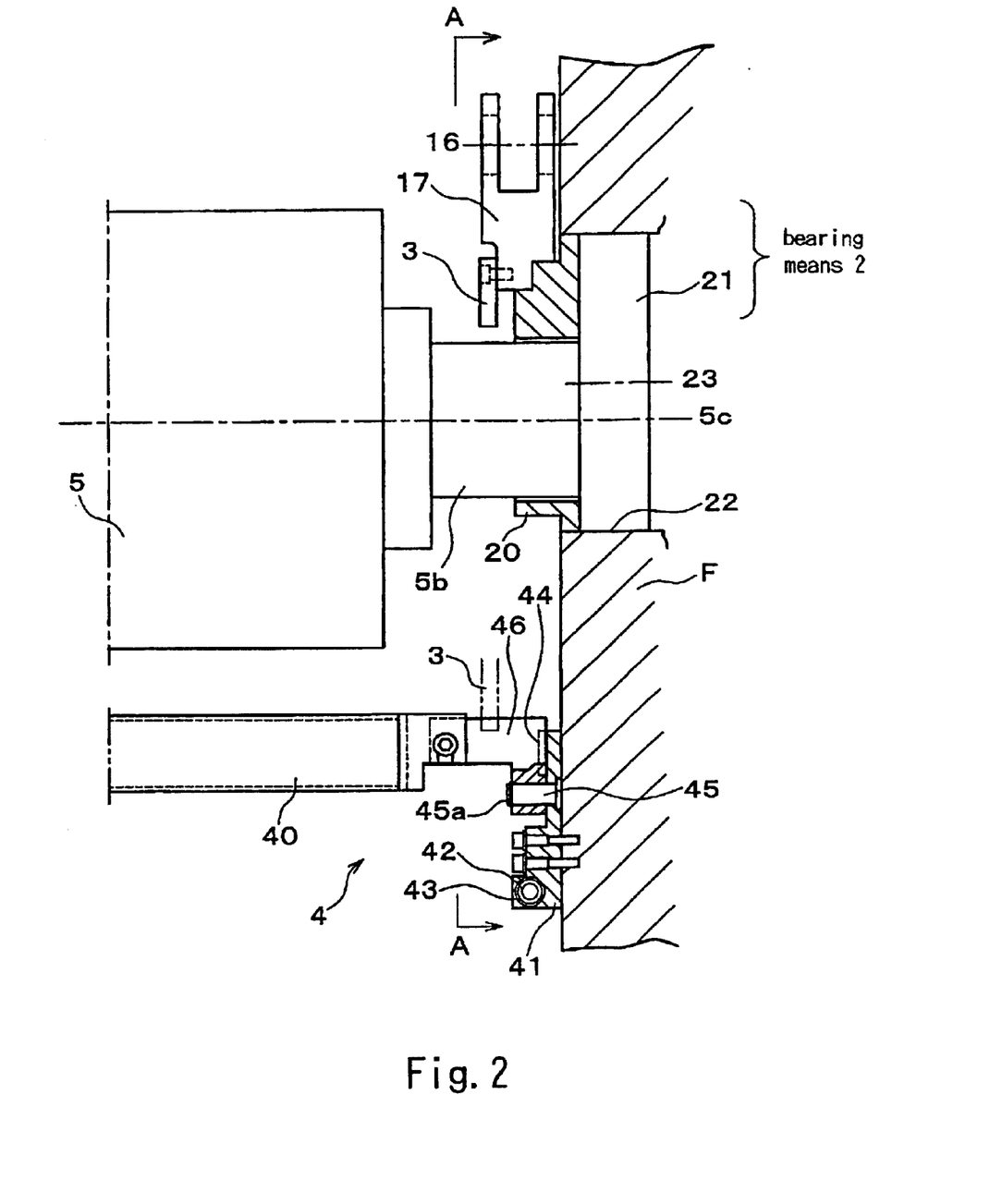
FIG. 2 is a cross-sectional view showing one of the sides of the safety device shown in FIG. 1.

A cam 3 is attached to the arm 17. The cam 3 is provided with a circular arc circumferential surface having a cam surface arranged to be a little larger in radius than the outer circumferential surface of the blanket cylinder 5 and also to be concentric with the blanket cylinder 5.

Figure 3:
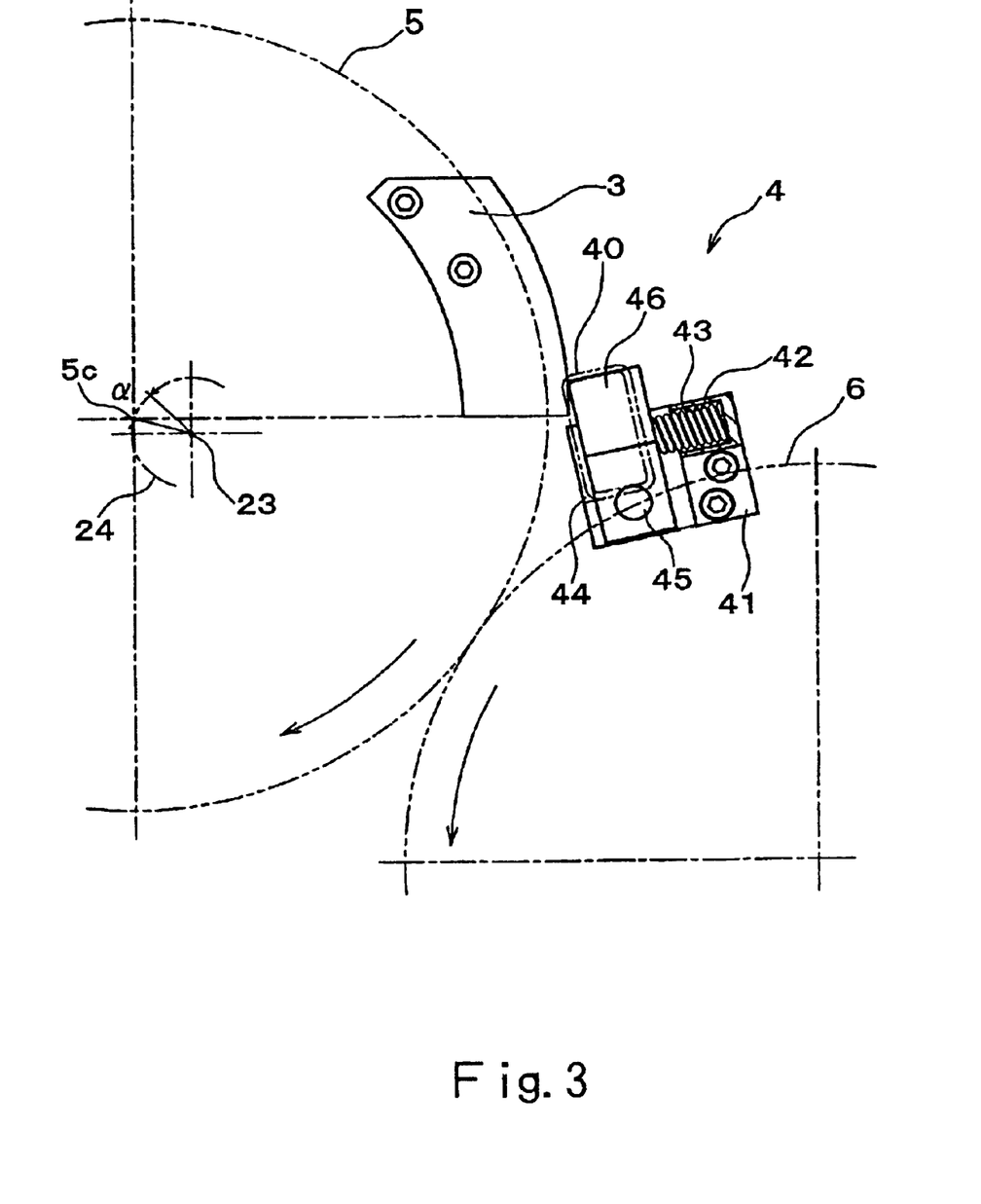
FIG. 3 is a cross-sectional view taken in the line A—A of FIG. 2, showing that a rod of an actuator is in the compressed state in the embodiment shown in FIG. 1.

On the other hand, a guard means 4 as shown in FIGS. 1, 2 and 3 is mounted to cover an in-running nip N formed by the blanket cylinder 5 and a plate cylinder 6. In more detail, the guard means 4 comprises a bracket 41 attached to each of two frames F, F opposing with each other (one of the frames is not shown), a stepped or joggled pin 45 installed in a stepped hole of each of the brackets 41, an L-shape arm 46 fitted movably in angular displacement to each of the stepped pins 45 with a snap or retaining ring 45a for a shaft and a guard member 40 which is positioned between the two frames F, F in parallel with the center of the shaft 5c of the blanket 5 and arranged to be a little longer than the length of the outer circumferential surface of the blanket cylinder 5. In addition, the both ends of the guard member 40 are fixed respectively to two L-shape arms 46, 46 (one of the arms is not shown). Further, a concave hole for spring 43 is provided in a raised portion of the bracket 41 on the opposite side of the blanket cylinder 5 with the L-shape arm 46 between, and a compression spring 42 being a forcing means is loaded in the concave hole 43 for spring 42 so as to regularly push the guard member 40 toward the blanket cylinder 5 via the L-shape arm 46.

Still further, a stopper 44 is provided in the bracket 41 on the opposite side of the raised portion with the L-shape arm 46 between so as to determine the limit of displacement of the guard member 40 pushed toward the blanket cylinder 5 via the L-shape arm 46.

Figure 4:
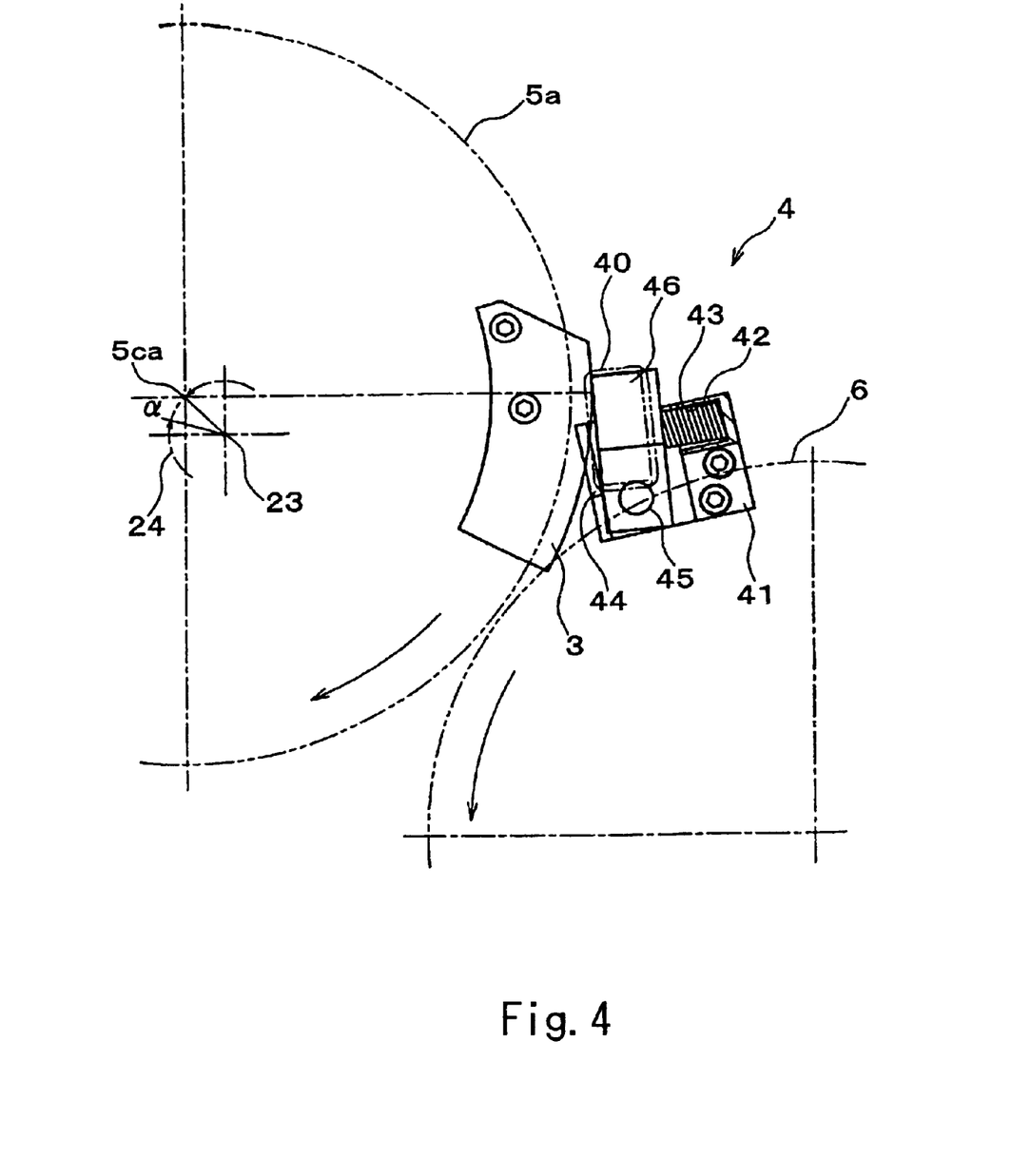
FIG. 4 is a cross-sectional view taken in the line A—A of FIG. 2, showing that a rod of the actuator is in the extended state in the embodiment shown in FIG. 1.

The operation of the embodiment of the present invention described above will be explained with reference to the accompanying drawings, in FIGS. 1, 3 and 4.

In operation of the rotary press, owing to the reasons above, the blanket cylinder 5 is shifted by the trip means 1 to the contact position and non-contact position with respect to the plate cylinder 6 and the traveling paper P at the traveling position (namely, other blanket cylinder positioned to be substantially symmetrical with respect to the traveling paper P but not shown).

Namely, when the rod 11a of the actuator 11 is in the retracted condition, the crotch arm 12 is in the position shown by a thick one point chain (dot-dash) line in FIG. 1, the blanket cylinder 5 is in the contact position with the plate cylinder 6 and the traveling paper P at the traveling position as shown by a two point chain (dot-dash) line 5. The cam surface of the cam 3 comes in contact with the L-shape arm 46 of the guard means 4 and the cam 3 maintains the guard member 40 which is pushed toward the outer circumferential surface of the blanket cylinder 5 by repulsive force of the compression spring 42, at the position apart by the predetermined gap G1 from the outer circumferential surface of the blanket cylinder 5. The guard member 40 is arranged to be in the position apart by substantially the same gap G2 as the above-mentioned predetermined gap G1 from the outer circumferential surface of the plate cylinder 6 at this time (see FIG. 1 and FIG. 3).

When the rod 11a of the actuator 11 extends from this condition, the crotch arm 12 rotates counterclockwise in angular displacement in FIG. 1. This change is shown by a thin one point chain (dot-dash) line in FIG. 1. Then, the arm 17 and its end of protrusion 16 rotate in angular displacement by α via the connecting rod 15 and move to positions 17a and 16a, respectively in FIG. 1 and at the same time the cap 20 and the bearing mechanism 21 rotate clockwise in angular displacement with respect to the center 23 of the opening and in turn the blanket cylinder 5, the shaft 5b of which is supported by the bearing mechanism 21 at the position eccentric by the quantity of eccentricity 24 from the center 23 of the opening, moves to the position 5ca as the center 5c of the shaft of the blanket cylinder 5 rotates clockwise in angular displacement by α. Owing to this movement, the blanket cylinder 5 moves to the position 5a, namely, to the position apart from the plate cylinder 6 and the traveling paper P at the traveling position as shown by a two point chain (dot-dash) line in FIG. 1. At this time, the cam 3 moves in angular displacement together with the cap 20. As the cam surface of the cam 3 is the circular arc circumferential surface having concentricity with the blanket cylinder 5 as described above, the cam 3 moves exactly the same as the blanket cylinder 5.

The cam surface of the cam 3 pushes back the L-shape arm 46 of the guard means 4 against the repulsive force of the compression spring 42 and makes the guard member 40 move in angular displacement to the position where the gap G1 from the outer circumferential surface of the blanket cylinder 5 remains unchanged. Although the gap G2 between the guard member 40 and the outer circumferential surface of the plate cylinder 6 becomes slightly small at this time of the displacement, the shape and/or the arrangement of the guard member 40 is formed so as not to come in contact with the outer circumferential surface of the plate cylinder 6.

The present invention is not limited to the specific embodiments herein shown and described above, but includes various changes and modifications in design which may be made in the invention without departing from the claims.

For example, a member such as an eccentric ring (not shown), an outer circumferential surface of which holds a center line in common with the blanket cylinder 5, is provided in an appropriate position of the cap 20 and also equipped with a magnifying glass-like arm (not shown) having a ring-shaped basement. The ring-shaped basement is set movably in angular displacement to the outer circumferential surface. And the guard member 40 is fixed to the tip of the arm so as to position apart by the predetermined gap G1 from the outer circumferential surface of the blanket cylinder 5. Furthermore, the guard member 40 may be linked to a guiding means (not shown) for possibly guiding the guard member 40 along the outer circumferential surface of the plate cylinder 6 apart by from the predetermined gap G2 from the outer circumferential surface of the plate cylinder 6. By this constitution, the guard member 40 moves in response to the movement of the blanket cylinder 5 via the cap 20 described above and both of the gap G1 between the outer circumferential surface of the blanket cylinder 5 and the guard member 40 and the gap G2 between the outer circumferential surface of the plate cylinder 6 and the guard member 40 may be set to be substantially constant in spite of the shift of the center of rotation of the blanket cylinder 5. In this case, it is not necessary for the guard member 40 to be pushed regularly toward the blanket cylinder 5 by the compression spring 42.

Furthermore, the place where the safety device of the present invention is installed is not limited to the in-running nip section established between the blanket cylinder 5 and the plate cylinder 6, but needless to say, may be possible in other various in-running nip sections, for example, between a watery roller and a plate cylinder.

According to the present invention, as the gap between the outer circumferential surface of each cylinder and the guard member i.e. a nip guard in the rotary press could be kept to be substantially constant, safety protection of the in-running nip has been attained in spite of the detachable trip of a blanket cylinder.

What is claimed is:

1. A safety device for rotary printing press provided at the feeding side of an in-running nip formed by a rotary body having the center of the rotation thereof being displaceable in position, the safety device comprising:

a guard member pivotally positioned in the vicinity of an outer circumferential surface of the rotary body; and a guard member displacement means positioned in a gap between the rotary body and the guard member for making the guard member displace in accordance with the displacement of the center of the rotation of the rotary body;

wherein the gap between the rotary body and the guard member is set to be substantially constant in spite of the movement or shift of the center of the rotation of the rotary body.

2. A safety device as set forth in claim 1, wherein the guard member is set to be in the state normally pushed toward the outer circumferential surface of the rotary body by a forcing means;

the guard member displacement means has a receiving surface for receiving the force from the forcing means; and said receiving surface is set to be displaceable in accordance with the movement or shift of the center of the rotation of the rotary body.

3. A safety device as set forth in claim 2, wherein the guard member displacement means rotatably supports the rotary body at the displaced or shifted position and has a bearing device provided movably in angular displacement with respect to a frame and also has a cam mounted on the bearing device, and a working surface of the cam is arranged to be the receiving surface.

4. A safety device as set forth in claim 3, wherein the rotary body is constituted of a blanket cylinder movably shifted to a contact position and a non-contact position with respect to a printing cylinder having the center of the rotation thereof being fixed; and the cam is provided with a circular arc circumferential surface having a cam surface arranged to be a little larger in radius than the outer circumferential surface of the blanket cylinder and also to be concentric with the blanket cylinder.

5. A safety device as set forth in claim 1, wherein the guard member displacement means is constituted of an actuator means, a bearing means and a cam.

6. A safety device as set forth in claim 5, wherein the rotary body is constituted of a blanket cylinder movably shifted to a contact position and a non-contact position with respect to a printing cylinder having the center of the rotation thereof being fixed; and the cam is provided with a circular arc circumferential surface having a cam surface arranged to be a little larger in radius than the outer circumferential surface of the blanket cylinder and also to be concentric with the blanket cylinder.

7. A safety device for rotary printing press provided at the feeding side of an in-running nip formed by a rotary body having the center of the rotation thereof being displaceable in position, the safety device comprising:

a guard member movably positioned in the vicinity of an outer circumferential surface of the rotary body; and a guard member displacement means positioned between the rotary body and the guard member for making the guard member displace in accordance with the displacement of the center of the rotation of the rotary body;

wherein a gap between the outer circumferential surface of the rotary body and the guard member is set to be substantially constant in spite of the movement or shift of the center of the rotation of the rotary body;

wherein the guard member displacement means is constituted of an actuator means, a bearing means and a cam;

wherein the actuator means is composed of a link mechanism;

wherein a driving source of the link mechanism is an actuator;

wherein a tip of a rod of the actuator is coupled movably in angular displacement to an end portion of one of two arms divaricating at an obtuse angle from a center of a crotch arm by making use of a bracket which supports a head side of the actuator as a cardinal point of angular displacement; and wherein the rotary body is constituted of a blanket cylinder movably shifted to a contact position and a non-contact position with respect to a printing cylinder having the center of the rotation thereof being fixed;

whereby said movable shifting of the blanket cylinder is detachably done in accordance with extension and retraction of the rod of the actuator.

8. A safety device as set forth in claim 7, wherein the tip of the other arm of the crotch arm is coupled movably in angular displacement to one end of a connecting rod;

said other end of the connecting rod is coupled movably in angular displacement to an end of salience of the arm which is fitted to a cap constituting a bearing means; whereby said bracket to the arm are coupled by the link mechanism.

9. A safety device as set forth in claim 8, wherein the cap is fitted integrally and movably in angular displacement to a bearing mechanism which is fitted movably in angular displacement about the center of an opening made in a frame; and the bearing mechanism movably supports a shaft of the blanket cylinder in order for the center of the shaft of the blanket cylinder to be eccentrically positioned by a constant quantity of eccentricity apart from the center of the opening.

10. A safety device for rotary printing press provided at the feeding side of an in-running nip formed by a rotary body having the center of the rotation thereof being displaceable in position, the safety device comprising:

a guard member movably positioned in the vicinity of an outer circumferential surface of the rotary body; and a guard member displacement means positioned between the rotary body and the auard member for making the guard member displace in accordance with the displacement of the center of the rotation of the rotary body;

wherein a gap between the outer circumferential surface of the rotary body and the guard member is set to be substantially constant in spite of the movement or shift of the center of the rotation of the rotary body;

wherein the rotary body is constituted of a blanket cylinder movably shifted to a contact position and a non-contact position with respect to a printing cylinder having the center of the rotation thereof being fixed; and wherein the guard member is included in a guard means, said guard means further comprising:

a bracket attached to each of the two frames opposing with each other;

a stepped or joggled pin installed in a stepped hole of each of the brackets;

an L-shape arm fitted movably in angular displacement to each stepped pin with a snap or retaining ring for a shaft; and the guard member is positioned between the two frames in parallel with the center of the shaft of the blanket and arranged to be a little longer than the length of the outer circumferential surface of the blanket cylinder.

11. A safety device as set forth in claim 10, wherein a concave hole is provided in a raised portion of the bracket on the opposite side of the blanket cylinder with the L-shape arm between, and a compression spring being a forcing means is loaded in the concave hole so as to regularly push the guard member toward the blanket cylinder via the L-shape arm.

12. A safety device as set forth in claim 10, wherein a stopper is provided in the bracket on the opposite side of the raised portion with the L-shape arm between so as to determine the limit of displacement of the guard member pushed toward the blanket cylinder via the L-shape arm.

13. A safety device as set forth in claim 11, wherein a stopper is provided in the bracket on the opposite side of the raised portion with the L-shape arm between so as to determine the limit of displacement of the guard member pushed toward the blanket cylinder via the L-shape arm.

14. A safety device for a rotary printing press including a body rotating about an axis, the body having a cylindrical surface at a first radial dimension with respect to the axis, the axis being displaceable with respect to a frame between first and second positions, the second position being substantially parallel to and laterally spaced from the first position, the safety device comprising:

a cam displaceable with the axis, the cam having an arcuate surface at a second radial dimension with respect to the axis, the second radial dimension being greater than the first radial dimension; and a guard contiguously engaging the cam, the guard including:
   a bracket fixed with respect to the frame;
   a member pivotally coupled to the bracket; and
   a resilient element extending between the bracket and the member, the resilient element biasing the member to pivot into engagement with the arcuate surface of the cam such that the member remains spaced from the cylindrical surface of the body by a substantially constant gap as the axis is displaced between the first and second positions, the substantially constant gap being equal to the difference between the first and second radial dimensions.

15. The safety device as set forth in claim 14, wherein the guard comprises an arm coupling the member to a pivot axis with respect to the bracket.

16. The safety device as set forth in claim 15, wherein the resilient element comprises a compression spring extending between first and second ends, the first end being received in a hole in the bracket, and the second end engaging the arm.

17. The safety device as set forth in claim 16, wherein the second end of the compression spring engages the arm at a distance from the pivot axis.

18. The safety device as set forth in claim 14, wherein the constant gap is set in accordance with a safety standard.

19. The safety device as set forth in claim 18, wherein the safety standard comprises International Standard ISO/DIS 12648.

20. The safety device as set forth in claim 14, wherein the constant gap is not greater than approximately six millimeters.

21. A method of protecting elements from being unintentionally drawn into an in-running nip between first and second counter-rotating cylinders of a rotary printing press, the first cylinder rotating about a first axis fixed with respect to a frame, the second cylinder rotating about a second axis parallel to the first axis and displaceable between first and second positions with respect to the frame, the second position being substantially parallel to and laterally spaced from the first position, the method comprising:

providing a guard extending parallel to the first and second axes, the providing including mounting a member pivotally with respect to the frame; and positioning the guard with respect to the in-running nip, the positioning including maintaining a substantially constant gap between the guard and the second cylinder as the second axis is displaced between the first and second positions, the positioning including biasing the member toward the second cylinder.

22. The method as set forth in claim 21, wherein the maintaining comprises adhering to a safety standard.

23. The method as set forth in claim 22, wherein the maintaining comprises adhering to International Standard ISO/DIS 12648.

24. The method as set forth in claim 21, wherein the positioning comprises maintaining the substantially constant gap no greater than six millimeters.

25. A safety device for a rotary printing press including a frame and counter-rotating plate and blanket cylinders defining an in-running nip, the blanket cylinder being movable between a first position relatively proximate the plate cylinder and a second position relatively distal the plate cylinder, the safety device comprising:

guard means for protecting against unintentional ingress into the in-running nip; and positioning means for pivotally maintaining a substantially constant gap between the guard means and the blanket cylinder as the blanket cylinder is moved between the first and second positions.

26. The safety device as set forth in claim 25, wherein the positioning means comprises a resilient element biasing the member toward the blanket cylinder.

* * * * *